United States Patent [19]

Bouanaka et al.

[11] Patent Number: 5,991,381

[45] Date of Patent: *Nov. 23, 1999

[54] METHOD AND APPARATUS FOR PROVIDING TELEPHONE CALLING CARD VALIDATION OVER A COMPUTER NETWORK

[75] Inventors: Hansali Bouanaka, Tinton Falls; Moshiur Rahman, Freehold, both of N.J.

[73] Assignee: AT&T Corp., New York, N.Y.

[ * ] Notice: This patent is subject to a terminal disclaimer.

[21] Appl. No.: 08/960,762

[22] Filed: Oct. 30, 1997

[51] Int. Cl.⁶ .................................................. H04M 15/00
[52] U.S. Cl. ..................... 379/115; 379/91.01; 705/26; 705/44
[58] Field of Search ............................... 379/91.01, 91.2, 379/112, 114, 115, 121, 127; 705/26, 39, 40, 44, 14; 235/386, 382

[56] References Cited

U.S. PATENT DOCUMENTS

| | | |
|---|---|---|
| 5,336,870 | 8/1994 | Hughes et al. . |
| 5,638,431 | 6/1997 | Everett et al. . |
| 5,749,075 | 5/1998 | Toader et al. ............................. 705/14 |
| 5,825,857 | 10/1998 | Reto et al. ................................ 379/112 |
| 5,835,580 | 11/1998 | Fraser ....................................... 379/115 |
| 5,845,267 | 12/1998 | Ronen ...................................... 379/114 |
| 5,867,495 | 2/1999 | Elliot et al. ............................. 379/114 |

OTHER PUBLICATIONS

Patent No. 5,638,431, filed on May 1, 1995 and issued on Jun. 10, 1997 to David A. Everett, et al.

Patent No. 5,336,870, filed on May 26, 1992 and issued on Aug. 9, 1994 to Thomas S. Hughes, et al.

Primary Examiner—Paul Loomis

[57] ABSTRACT

A calling card validation method and system for automatically issuing calling cards and placing charges on customer's telephone bill. The calling card validation is requested in a computer protocol and converted to a telephone protocol, then a response is generated and the billing information is added to a telephone data base, after validation occurred successfully.

12 Claims, 2 Drawing Sheets

METHOD AND APPARATUS FOR PROVIDING TELEPHONE CALLING CARD VALIDATION OVER A COMPUTER NETWORK

CROSS-REFERENCE TO RELATED APPLICATIONS

The invention disclosed herein is related to the copending U.S. patent applications by Bouanaka, et al., entitled "METHOD AND APPARATUS FOR PROVIDING TELEPHONE DIRECTORY ASSISTANCE OVER A COMPUTER NETWORK", Ser. No. 08/928,079 filed on September 1997, and "METHOD AND APPARATUS FOR PROVIDING TELEPHONE BILLING AND AUTHENTICATION OVER A COMPUTER NETWORK", Ser. No. 08/560,772 filed on October 1997, both assigned to AT&T, and incorporated herein by reference.

FIELD OF THE INVENTION

The present invention relates generally to providing validation of telephone calling cards, and more particularly, to providing validation of computer generated calling cards over a computer network linked to the telephone billing data base.

BACKGROUND OF THE INVENTION

Calling cards provide telephone users the ability to charge the cost of making a telephone call to an account not associated with the originating telephone number. The calling cards can be debit cards or credit cards or the bill can be directed to an account associated with another telephone number. See for example, U.S. Pat. No. 5,638,431. However, these card often require significant delay between ordering and activation.

Coupling computer and telephone systems to facilitate automated billing, such as U.S. Pat. No. 5,640,446, fail to provide billing for prepaid calling cards to an existing telephone account.

Calling cards can be provided on-line and the charges for the card can be placed on a credit card account similar to conventional on-line purchases. However, on-line calling cards fail to provide real-time link to existing telephone billing data base. Thus, charges for calling cards can not be directly placed on telephone accounts.

A recognized problem, therefore, is the failure of on-line provided calling cards to automatically validate potential customer's current telephone billing history. Additionally, current on-line calling cards fail to provide automatic billing to new or existing telephone accounts maintained at by a telephone company.

SUMMARY OF THE INVENTION

The aforementioned problems are solved by providing an on-line calling card system that is linked to the telephone accounting data base.

In an embodiment of the present invention, a customer orders a calling card over a computer network. Customer's choosing pre-paid calling cards, can then choose to place the charge for the calling card on their existing regular or long distance telephone account. A request for validation of the telephone account information is sent to the appropriate telephone network. Upon validation of account information, the customer receives a calling card number that can be copied from the computer terminal or printed. The calling card number is thus instantly activated and the customer need not provide credit card numbers or other form of on-line currency over the computer network.

DETAILED DESCRIPTION OF THE PREFERRED EMBODIMENT

Figure 1:
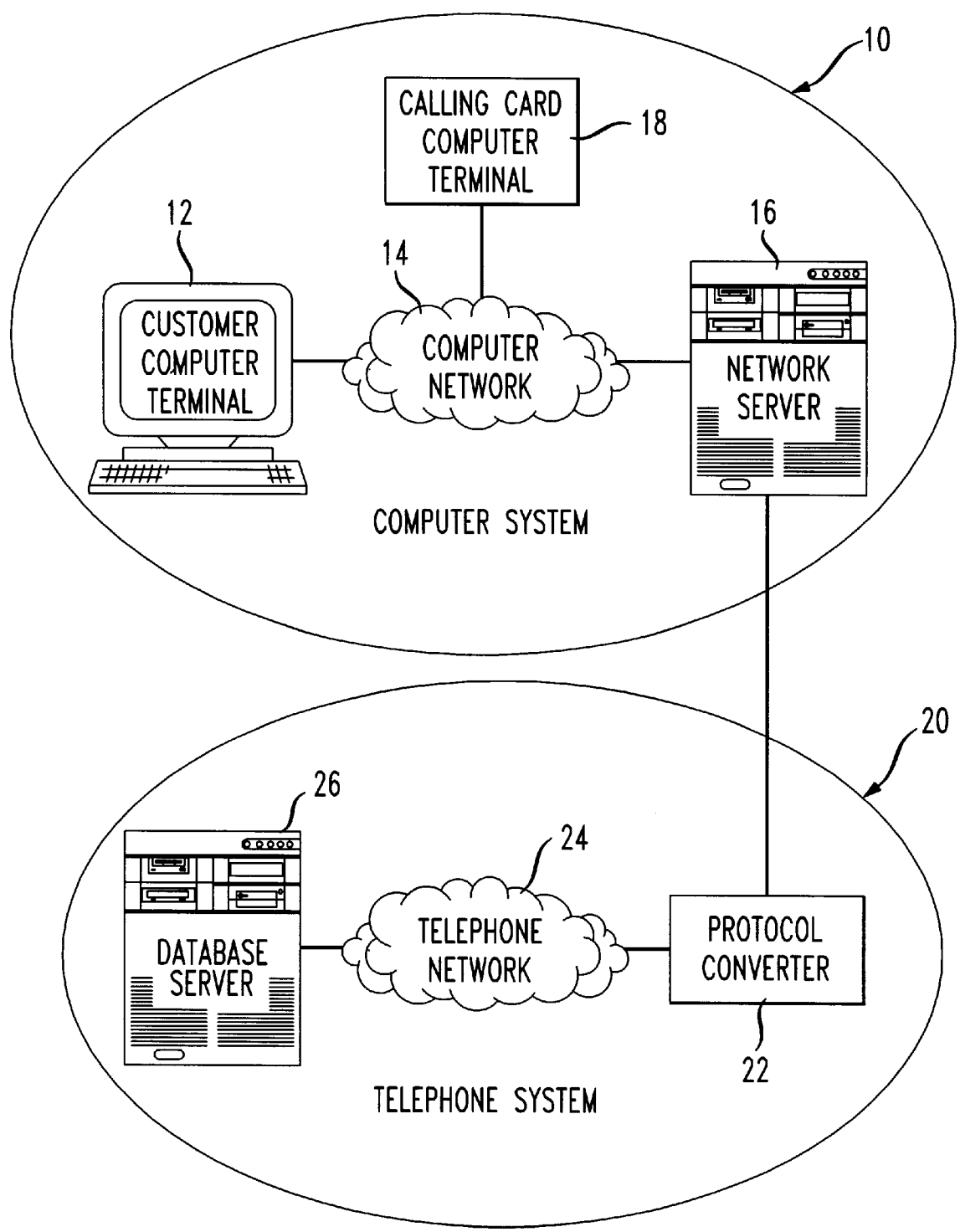
FIG. 1 is a system diagram illustrating an embodiment of a calling card validation system.

Referring to FIG. 1, a telephone system 20 receives a request for validation of customer telephone account information from a computer network 10. The telephone system 20 searches its account data base, then transmits a response to the computer system 10. Upon validation, a charge is placed on the customer's telephone account corresponding to the calling card value purchased.

The computer system 10 includes one or more calling card computer terminals 18 for processing requests and receiving responses, one or more customer computer terminals 12, one or more computer networks 14 connected to the calling card computer terminals 18 and to the customer computer terminals 12, and one or more network servers 16 connected to the computer network 14.

The computer terminals 12 and 18 can be any computer network compatible device including a personal computer, a display terminal, a laptop computer, a palmtop computer, a workstation, a mainframe computer, or other network compatible device. The customer computer terminal 12 is used by customers to order calling cards and receive the calling card access number. The calling card computer terminal 18 is used to process the requests for a calling card and the responses. Optionally, the calling card computer evaluates the response messages and determines if the customer qualifies for a calling card.

The computer network 14 transmits messages in a computer network protocol. Computer network protocols, well known in the art, include local area networks, wide area networks, and other computer networks. It is a preferred embodiment of the present invention that the computer network 14 include the Internet. The computer network 14 can be a direct link such as a modem link.

A preferred embodiment of the invention includes encrypted communication between the customer computer terminal 12 and the calling card computer terminal 18 as well as between the calling card computer terminal 18 and the network server 16. Additionally, the network server 16 and the protocol converter 22 can be co-located or the communication can be encrypted to protect the communication.

In another embodiment, the network includes a network capability in the computer terminal 18 connected directly to a protocol converter 22.

The computer system 10 can be a private computer system such as an intra-company or campus computer system. Also, the computer system 10 can encompass a global computer system including the Internet or combinations of varying networks.

The network server 16 is a computer network compatible device that converts network protocols to a known communication protocol. It is a preferred embodiment of the present invention that the network server converts various network protocols to a Transmission Control Protocol/Internet Protocol ("TCP/IP"). If the network protocol used by the computer network 14 is TCP/IP then the network server 16 need not perform a conversion and the network server 16 is optional. The calling card computer terminal 18 knows the network address of network server 16 (FIG. 1). If no network server 16 is required, the protocol converter 22 can communicate directly with the computer network 14 and the computer terminal 18.

The telephone system 20 includes one or more protocol converters 22, one or more telephone networks 24 connected to the protocol converter 22, and one or more data base servers 26 connected to the telephone network 24. The protocol converter 22 is connected to a network server 16 in the computer system 10 or directly to the computer network 14 if no network server is required. The data base server 26 contains telephone customer information including billing information.

The protocol converter 22 converts a known communication protocol to a telephone protocol. It is a preferred embodiment of the present invention that the protocol converter 22 be a Signaling Protocol Converter ("SPC") available from American Telegraph and Telephone ("AT&T"). The SPC converts messages between TCP/IP protocol and Signaling System 7 ("SS7") protocol. Such a SS7 message includes a Transactional Capabilities Application Part ("TCAP") message.

The telephone network 24 includes telephone networks such as private branch exchanges ("PBX") networks, local exchange carrier ("LEC") networks, and long distance networks. The telephone system 20 can be an entirely private telephone system such as is an intra-company or campus telephone system.

Data base server 26 includes data base servers used to provide customer billing information to telephone companies.

Figure 2:
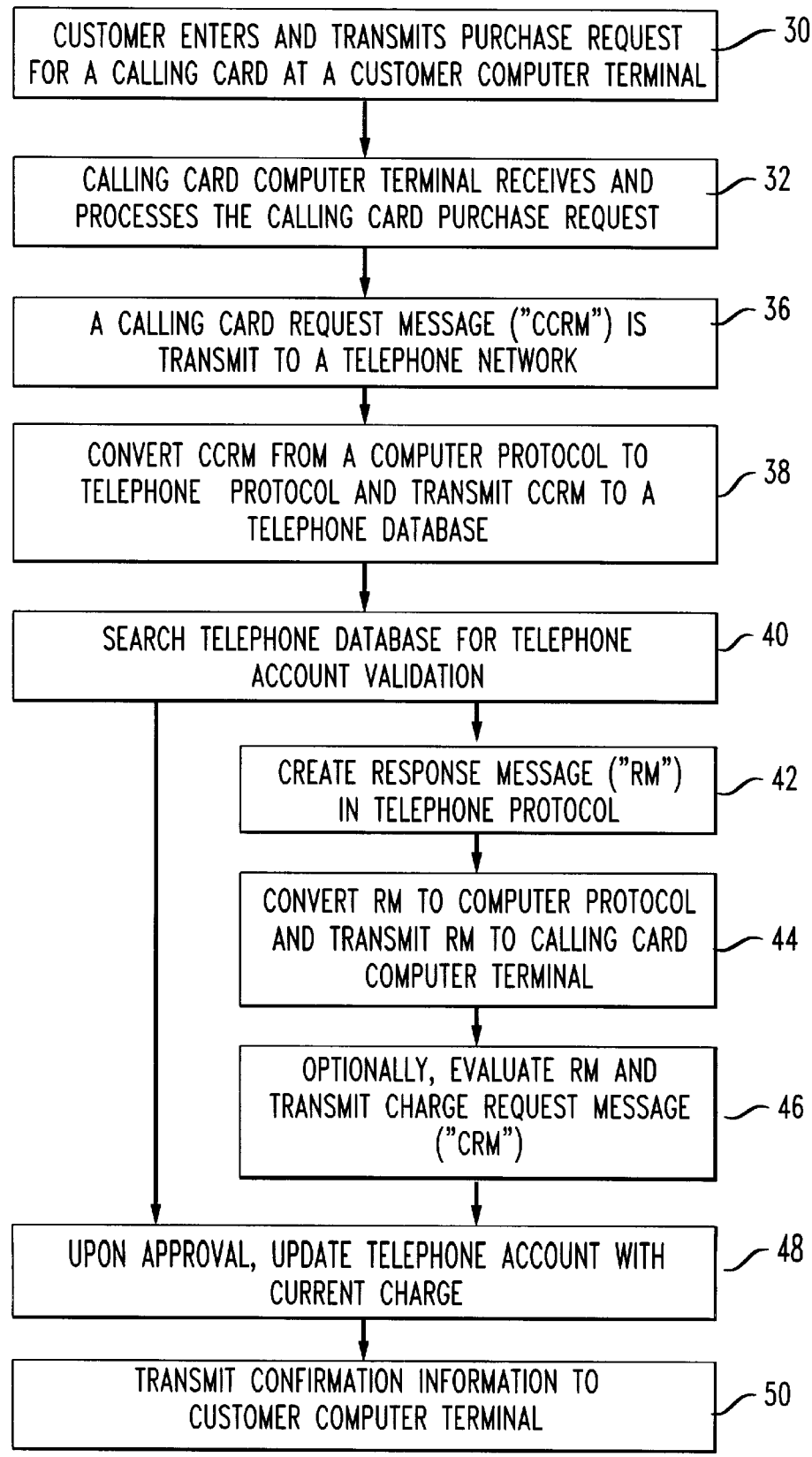
FIG. 2 is a flow diagram illustrating an embodiment of a calling card validation transaction.

Referring to FIG. 2, customers enters 30 a purchase orders for a new calling card or for an update to an existing calling card from a customer computer terminal 12 (FIG. 1). The order indicates at least the telephone account to be charged for the cost of the calling card. Then, the purchase request is transmitted to the calling card computer terminal 18 (FIG. 1).

After receiving 32 the calling card purchase request, the calling card computer terminal 18 automatically processes 32 the purchase request. Processing includes verifying that the purchase request information is complete. Optionally, additional manual processing of the calling card purchase request may occur.

The calling card computer terminal 18 generates and transmits 36 an calling card request message ("CCRM"). The CCRM is transmitted through the computer network 14 (FIG. 1) to a network server 16 (FIG. 1) in the network protocol. The CCRM contains calling card information which can include telephone number, customer's name, and other information such as amount of charge.

If the network protocol is not known to the protocol converter, the network server 16 (FIG. 1) converts 38 the CCRM from the network protocol to a protocol known to the protocol converter 22 and transmits the CCRM to the telephone data base server 26 (FIG. 1).

The protocol converter 22 (FIG. 1) receives the CCRM, converts the CCRM to a telephone protocol. Then, the protocol converter 22 transmits the CCRM to the data base server 26 (FIG. 1) through the telephone network 24 (FIG. 1) in the telephone protocol.

The data base server 26 (FIG. 1) accesses 40 the telephone data base. The telephone data base contains customer account information including residential, commercial, and mobile telephone billing information.

The charges for the calling card can be added to the customer's telephone account after the data base is accessed or the charge can be added to the account after the receipt of a Charge Request Message("CRM"), described below.

The data base server generates 42 a response message ("RM"). The data base server 26 (FIG. 1) transmits 44 the response message to the calling card computer terminal 18. The data base server 26 transmits the response message in the telephone protocol through the telephone network 24 to the protocol converter 22. The protocol converter 22 converts the response message from the telephone protocol to a computer protocol and transmits it to the computer system 10. The network server 16 in the computer system 10 receives the response message. If the network protocol is different then the computer protocol known to the protocol converter 22, the network server 16 translates the response message to the network protocol. The network server 16 transmits the response message to the calling card computer terminal 18 through the computer network 14.

Optionally, the calling card computer terminal evaluates 46 the RM and approves the purchase. Then the calling card computer 18 sends a Charge request message ("CRM") to the data base server 26. Then the charge is placed on the appropriate telephone account.

The CCRM includes a variety of search parameters and various search types. For example, the request can be a simple request for a telephone number associated with a person or business name and address. A complex request can include requests for the customer's telephone number, payment history, payment due date, current balance, social security number, and non-telephone payment option. The optional feature of a non-telephone payment option indicates whether the customer has approved non-telephone charges to be placed on their telephone bill. Type of service desired includes requesting various responses such as small purchase authorization, large purchase authorization, full customer background information, and status of prior payments.

Upon approval, the telephone data base is updated 48 to reflect the charge on the customer's telephone account for the calling card purchased. Purchases include new calling cards of varying amount, increasing the balance on existing calling card, and "cashing-in" existing credit cards. A customer can cash-in an existing calling card and receive a credit to their telephone account for the amount remaining on the calling card. A CCRM or CRM can indicate that the specified amount should be credited rather then debited to the specified telephone account.

After the telephone account is charged for the calling card purchase, the a confirmation response message is transmitted 50 to the customer computer terminal 12 (FIG. 1).

The RM includes the requested information or a notice. The response includes all or some of the information requested with the remainder indicated as not available. Notices include "notice of excessive response", "notice of null set", "notice of error", and "notice of insufficient data." The "notice of excessive response" indicates that the search is likely to return more than a specified number of responses. This can occur when the request contains only a common name such as "John Smith" and no additional information. In a preferred embodiment, the customer's name and telephone number are included in the request message to avoid this possibility. The "notice of null set" indicates that no information matches the request. The "notice of error" indicates that the request can not be processed. The "notice of insufficient data" indicates that the request message failed to specify enough information to form a search.

By using the telephone authentication system described above, customers can purchase calling card options and place the associated charges directly on their telephone bill. Thus, the need for credit cards or other on-line currency is eliminated.

A preferred embodiment includes an intra-company or intra-campus computer and telephone networks. For example, an employee could order company provided calling cards and the charges are placed on the employee's corporate telephone bill. Likewise, an employee or student in a campus wide computer and telephone network could order a calling card and the charges would appear on their telephone bill.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

What is claimed is:

1. A method of validating calling cards comprising the steps of:
   (a) receiving a calling card request message in a telephone system from a computer system, the request message being in a first computer protocol and specifying calling card information;
   (b) converting the request message to a telephone protocol;
   (c) transmitting the request message in the telephone protocol to a telephone data base server;
   (d) searching a telephone data base for a validating match with the information in the request message;
   (e) Charging customer's telephone account based on information from the request message;
   (f) generating a response message in response to the search in the telephone protocol;
   (g) converting the response message to the first computer protocol; and
   (h) transmitting the response message to the computer system.

2. The method of validating calling cards as recited in claim 1, wherein the receiving calling card request message step includes:
   (a) entering calling card information at a first computer terminal;
   (b) transmitting the calling card information to a second computer terminal in a second computer protocol;
   (c) creating a calling card request message including calling card information at the second computer terminal;
   (d) transmitting the calling card request message through a computer network using a second computer protocol;
   (e) converting the request message to the first computer protocol; and
   (f) transmitting the request message in the first computer protocol to the telephone system.

3. The method of validating calling cards as recited in claim 2, wherein the first computer protocol is the same as the second computer protocol.

4. The method of validating calling cards as recited in claim 2, wherein the computer messages are encrypted before transmission.

5. A method of validating calling cards comprising the steps of:
   (a) receiving a calling card request message in a telephone system from a computer system, the request message being in a first computer protocol and specifying customer information;
   (b) converting the request message to a telephone protocol;
   (c) transmitting the request message in the telephone protocol to a telephone data base server;
   (d) searching a telephone data base for a validating match with the calling card information in the request message;
   (e) generating a response message in the telephone protocol including validation data or error message;
   (f) converting the response message to the first computer protocol;
   (g) transmitting the response message to the computer system;
   (h) evaluating the response message in the computer system;
   (i) transmitting a charge request message from the computer system to the telephone system
   (j) converting the charge request message to the telephone protocol; and
   (k) Charging customer's telephone account based on information in the charge request message.

6. The method of validating calling cards as recited in claim 5, wherein the receiving calling card request message step includes:
   (a) entering calling card information at a first computer terminal;
   (b) transmitting the calling card information to a second computer terminal in a second computer protocol;
   (c) creating a calling card request message including calling card information at the second computer terminal;
   (d) transmitting the calling card request message through a computer network using a second computer protocol;
   (e) converting the request message to the first computer protocol; and
   (f) transmitting the request message in the first computer protocol to the telephone system.

7. The method of validating calling cards as recited in claim 6, wherein the computer network is the Internet.

8. The method of validating calling cards as recited in claim 6, wherein the computer messages are encrypted before transmission.

9. A calling card validation system comprising:
   (a) a computer system;
   (b) a protocol converter connected to the computer system, the protocol converter converting messages between a first computer protocol and a telephone communication protocol;
   (c) a telephone communication network connected to the protocol converter;
   (d) a data base server connected to the telephone communication network, the data base server comprising telephone billing information from a telephone data base for charging calling card charges to telephone accounts;

(e) a network server connected to the protocol converter for converting messages between the first computer protocol and a second computer protocol;

(f) a computer network utilizing a second computer protocol, the computer network being connected to the network server;

(g) a first computer terminal for entering calling card information and displaying response messages, the first computer terminal being connected to the computer network; and (h) a second computer terminal for processing messages including generating calling card request messages, charge request messages, and response messages, the second computer terminal being connected to the first computer terminal through the computer network.

10. The calling card validation system as recited in claim 9 wherein the computer network includes the Internet.

11. The calling card validation system as recited in claim 9 wherein the first computer protocol being Transmission Control Protocol/Internet Protocol.

12. The calling card validation system as recited in claim 9 wherein the telephone communication protocol being a Signaling System 7 protocol.

\* \* \* \* \*